United States Patent
Bradway et al.

(10) Patent No.: US 11,541,671 B2
(45) Date of Patent: Jan. 3, 2023

(54) APPARATUS FOR GENERAL OBJECT HOLDING DURING PRINTING USING MULTIPLE CONFORMABLE GRIPPER BALLS

(71) Applicant: XEROX CORPORATION, Norwalk, CT (US)

(72) Inventors: Jeffrey J Bradway, Rochester, NY (US); Linn C Hoover, Webster, NY (US); Erwin Ruiz, Rochester, NY (US); Paul M Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 643 days.

(21) Appl. No.: 16/683,463

(22) Filed: Nov. 14, 2019

(65) Prior Publication Data

US 2020/0078958 A1   Mar. 12, 2020

Related U.S. Application Data

(62) Division of application No. 15/477,454, filed on Apr. 3, 2017, now Pat. No. 10,518,421.

(51) Int. Cl.

| | |
|---|---|
| *B25J 15/00* | (2006.01) |
| *B25J 15/12* | (2006.01) |
| *B41J 3/407* | (2006.01) |
| *B33Y 30/00* | (2015.01) |
| *B25B 11/00* | (2006.01) |

(52) U.S. Cl.
CPC ....... *B41J 3/40731* (2020.08); *B25J 15/0023* (2013.01); *B33Y 30/00* (2014.12); *B41J 3/4073* (2013.01); *B41J 3/40733* (2020.08); *B25B 11/005* (2013.01)

(58) Field of Classification Search
CPC ... B65G 47/91; B25J 15/0023; B41J 3/40731; B41J 3/40733; B41J 3/4073
USPC .................................................. 294/185, 189
See application file for complete search history.

(56) References Cited

U.S. PATENT DOCUMENTS

| | | | | |
|---|---|---|---|---|
| 4,561,686 | A * | 12/1985 | Atchley | B66C 1/0231 |
| | | | | 294/188 |
| 7,600,450 | B2 | 10/2009 | Montgomery et al. | |
| 8,882,165 | B2 * | 11/2014 | Lipson | B25J 15/12 |
| | | | | 294/188 |
| 9,827,784 | B1 * | 11/2017 | Buchar | B41J 3/543 |
| 9,925,799 | B1 * | 3/2018 | Fromm | B41J 3/40731 |
| 10,087,020 | B1 * | 10/2018 | Ruiz | B25J 15/0023 |

(Continued)

OTHER PUBLICATIONS

U.S. Appl. No. 15/163,880, filed May 25, 2016, and entitled System for Printing On Three-Dimensional (3D) Objects by Wayne A. Buchar et al.

*Primary Examiner* — Paul T Chin

(57) ABSTRACT

A universal object holding mechanism for holding three-dimensional objects for printing thereon uses multiple conformable balls mounted within a pattern of holes in a two part back plate. The multiple conformable balls are pressed into an object, which in turn, is pressed against a datum surface that represents desired spacing away from print heads. Vacuum is applied to the multiple conformable balls which grip the object. The multiple conformable balls are filled with particulates that cause the multiple conformable balls to become rigid when the vacuum is applied. This contributes to keeping the object from moving when it is being moved past a print head.

20 Claims, 7 Drawing Sheets

(56) References Cited

U.S. PATENT DOCUMENTS

| | | | |
|---|---|---|---|
| 10,308,038 B2* | 6/2019 | Hoover | B25J 15/0616 |
| 10,369,806 B2* | 8/2019 | Hoover | B41J 3/4073 |
| 10,518,421 B2* | 12/2019 | Bradway | B41J 3/4073 |
| 10,661,446 B2* | 5/2020 | Hurwit | B25J 15/0052 |
| 2015/0272749 A1* | 10/2015 | Amend, Jr. | A61F 2/588 |
| | | | 623/64 |
| 2018/0281464 A1* | 10/2018 | Bradway | B41J 3/4073 |
| 2018/0281465 A1* | 10/2018 | Liu | B41J 3/4073 |

* cited by examiner

APPARATUS FOR GENERAL OBJECT HOLDING DURING PRINTING USING MULTIPLE CONFORMABLE GRIPPER BALLS

CROSS REFERENCE TO RELATED APPLICATIONS

This is a divisional of U.S. application Ser. No. 15/477,454 filed Apr. 3, 2017 by the same inventors and claims priority therefrom. This divisional application is being filed in response to a restriction requirement in that prior application.

Cross-referenced is commonly assigned U.S. application Ser. No. 15/477,125, filed Apr. 3, 2017, and entitled VACUUM TUBE OBJECT CLAMPING ARRAY WITH CONFORMABLE PADS by Timothy P. Foley et al; U.S. application Ser. No. 15/477,127, filed Apr. 3, 2017, and entitled APPARATUS FOR HOLDING DURING THREE-DIMENSIONAL (3D) OBJECTS DURING PRINTING THEREON by Jeffrey J. Bradway et al; U.S. application Ser. No. 15/477,126, filed Apr. 3, 2017, and entitled UNIVERSAL PART GRIPPER WITH CONFORMABLE TUBE GRIPPERS by Linn C. Hoover et al; U.S. application Ser. No. 15/477,427, filed Apr. 3, 2017, and entitled SPRING LOADED SUCTION CUP ARRAY GRIPPER by Paul M. Fromm et al; U.S. application Ser. No. 62/480,563, filed Apr. 3, 2017, and entitled UNIVERSAL OBJECT HOLDER FOR 3-D PRINTING USING A CONFORMABLE GRIPPER BALL by Erwin Ruiz et al; U.S. application Ser. No. 15/477,439, filed Apr. 3, 2017, and entitled UNIVERSAL PART GRIPPER USING 3-D PRINTED MOUNTING PLATE by Linn C. Hoover et al; U.S. application Ser. No. 15/477,464, filed Apr. 3, 2017, and entitled AIR PRESSURE LOADED MEMBRANE AND PIN ARRAY GRIPPER by Paul M. Fromm et al; U.S. application Ser. No. 15/477,488, filed Apr. 3, 2017, and entitled APPARATUS FOR REPEATABLE STAGING AND HOLDING OBJECTS IN A DIRECT TO OBJECT PRINTER USING AN ARRAY OF PINS by Jeffrey J. Bradway et al; and U.S. application Ser. No. 15/477,478, filed Apr. 3, 2017, and entitled SPRING LOADED IRIS MECHANISM STACK GRIPPER by Paul M. Fromm et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2D) media printing technology, to apply image content onto three-dimensional objects would be difficult. Since the surfaces to be printed must be presented to the print heads as relatively flat, two-dimensional surfaces, the objects have to be maneuvered carefully to present portions of the articles as parallel planes to the print heads.

One Direct to Object printing system that accomplishes this is disclosed in copending and commonly assigned U.S. patent application Ser. No. 15/163880, filed on May 25, 2016, and entitled SYSTEM FOR PRINTING ON THREE-DIMENSIONAL (3D) OBJECTS by Wayne A. Buchar et al. This printing system includes a plurality of print heads arranged in a 2-D array, each printhead being configured to eject marking material, a support member positioned to be parallel to a plane formed by the 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference to the extent necessary to the practice the present disclosure and in its entirety.

A problem with this approach is that it requires a unique part holder for each part that is to be printed. Presently, printers come with a set of standard object holders and additional holders must be ordered for other objects and even variations in the shape of "standard" objects. The part holders are currently machined metal brackets with dedicated locating and fastening features machined into each holder. This limits the ability of an operator to print on general objects as requested by end users. A standalone spherical shaped conformable gripper filled with granular material is shown in U.S. Pat. No. 8,882,165 and U.S. Pat. No. 7,600,450 B1 shows curvature conformable gripping dies used in the oil industry.

SUMMARY

In answer to this problem, disclosed is a universal holder for many types of objects. The universal holder includes multiple small grippers comprised of particle filled elastic balls selectively positioned around favorable geometry of an object to be held. Vacuum is applied to the interior space of the gripper balls causing the particulate to compact and the grippers to become mostly rigid. The friction from the elastic surface of the balls hold the object in place. Multiple gripper balls allow for holding objects larger than a single gripper ball. Gripper balls on the left and right are drawn together by spring force. Gripper balls could also be used in the interior of an object.

BRIEF DESCRIPTION OF THE DRAWINGS

The foregoing aspects and other features of a universal holder for a printing system that prints images on 3-D objects are explained in the following description, taken in connection with the accompanying drawings.

DETAILED DESCRIPTION

Figure 1:
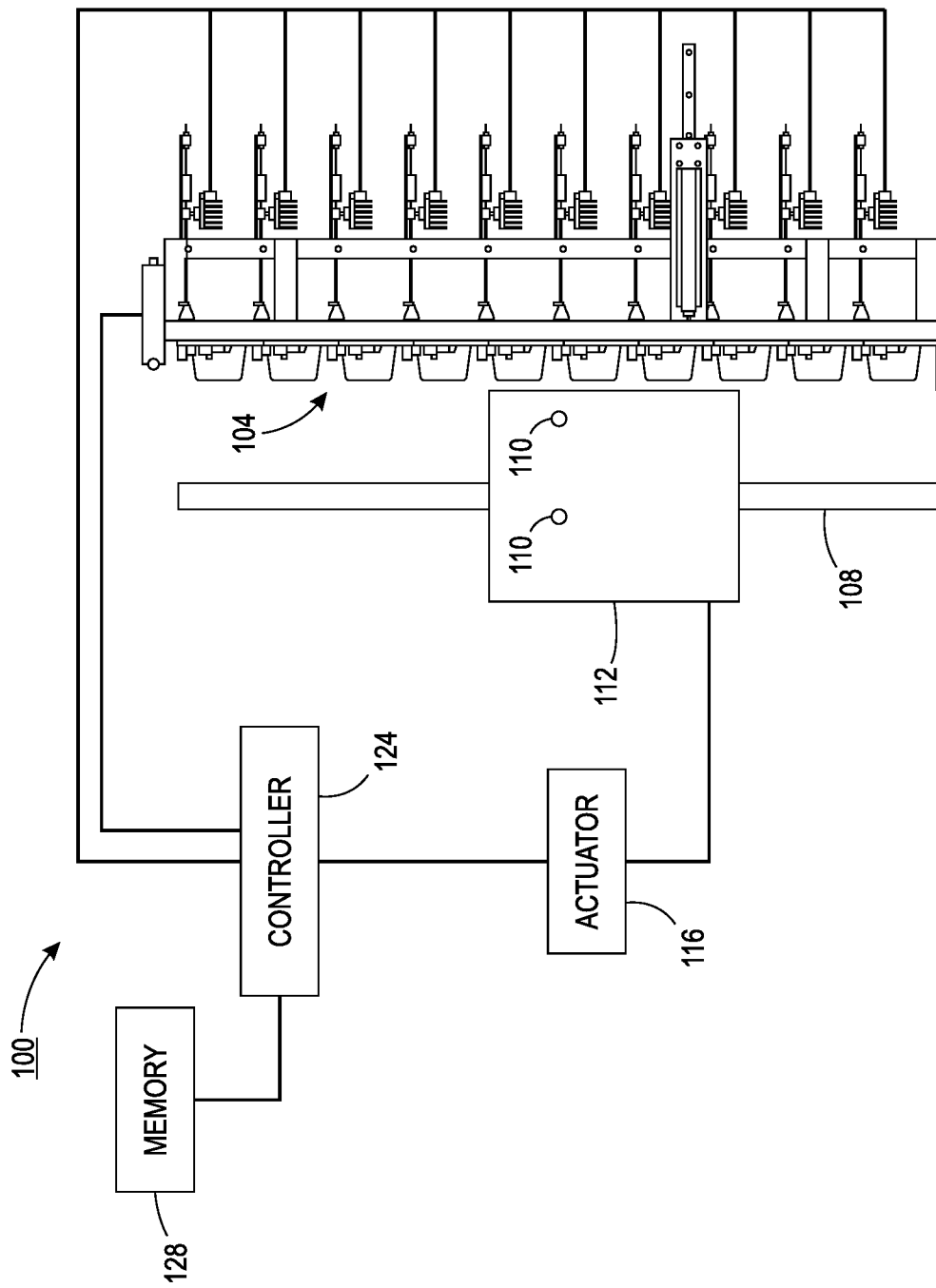
FIG. 1 illustrates an exemplary printing system 100 configured to print on a 3-D object.

For a general understanding of the present embodiments, reference is made to the drawings. In the drawings, like reference numerals have been used throughout to designate like elements.

FIG. 1 illustrates an exemplary printing system 100 configured to print on a 3-D object. The printing system 100 includes an array of print heads 104, a support member 108, a member 112 movably mounted to the support member 108, an actuator 116 operatively connected to the movably mounted member 112, a universal object holder 200 configured to mount to the movably mounted member 112, and a controller 124 operatively connected to the plurality of print heads and the actuator. As shown in FIG. 1, the array of print heads 104 is arranged in a two-dimensional array, which in the figure is a 10×1 array, although other array configurations can be used. Each printhead is fluidly connected to a supply of marking material (not shown) and is configured to eject marking material received from the supply. Some of the print heads can be connected to the same supply or each printhead can be connected to its own supply so each printhead can eject a different marking material.

The support member 108 is positioned to be parallel to a plane formed by the array of print heads and, as shown in the figure, is oriented so one end of the support member 108 is at a higher gravitational potential than the other end of the support member. This orientation enables the printing system 100 to have a smaller footprint than an alternative embodiment that horizontally orients the array of print heads and configures the support member, movably mounted member, and object holder 200 to enable the object holder to pass objects past the horizontally arranged print heads so the print heads can eject marking material downwardly on the objects.

The member 112 is movably mounted to the support member 108 to enable the member to slide along the support member. In some embodiments, the member 112 can move bi-directionally along the support member. In other embodiments, the support member 108 is configured to provide a return path to the lower end of the support member to form a track for the movably mounted member. The actuator 116 is operatively connected to the movably mounted member 112 so the actuator 116 can move the moveably mounted member 112 along the support member 108 and enable the object holder 200 connected to the moveably mounted member 112 to pass the array of print heads 104 in one dimension of the two-dimensional array of print heads. In the embodiment depicted in the figure, the universal object holder 200 moves an object 205 along the length dimension of the array of print heads 104 by conventional means, such as, with the use of pulleys and belts or screw drive.

The controller 124 is configured with programmed instructions stored in a memory 128 operatively connected to the controller so the controller can execute the programmed instructions to operate components in the printing system 100. Thus, the controller 124 is configured to operate the actuator 116 to move the object holder 200 past the array of print heads 104 and to operate the array of print heads 104 to eject marking material onto objects held by the object holder 200 as the object holder passes the array of print heads 104.

Figure 2:
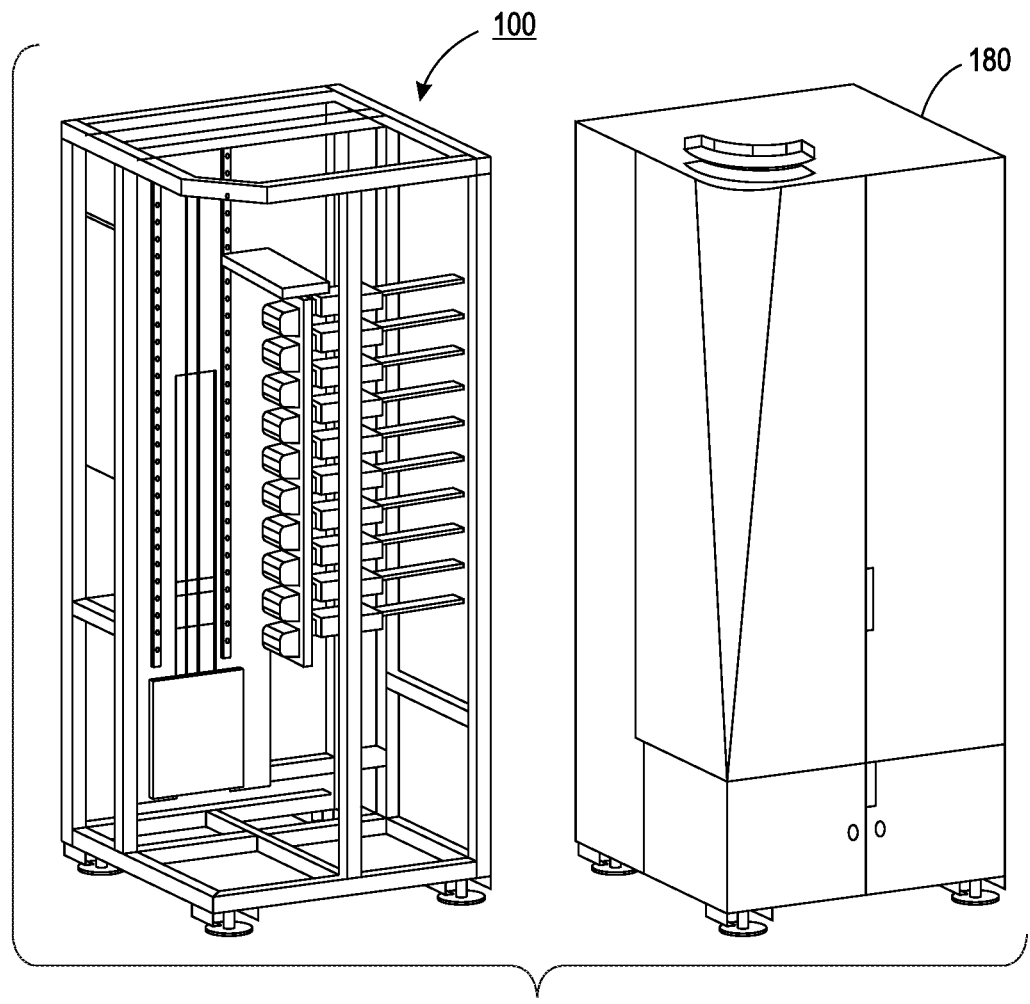
FIG. 2 depicts a cabinet within which the exemplary printing system 100 shown in FIG. 1 can be installed.

The system configuration shown in FIG. 1 is especially advantageous in a number of aspects. For one, as noted above, the vertical configuration of the array of print heads 104 and the support member 108 enables the system 100 to have a smaller footprint than a system configured with a horizontal orientation of the array and support member. This smaller footprint of the system enables the system 100 to be housed in a single cabinet 180, as depicted in FIG. 2, and installed in non-production outlets. Once installed, a universal or general object holder, as described further below, can be used with the system to print a variety of goods that are generic in appearance until printed.

Figure 3:
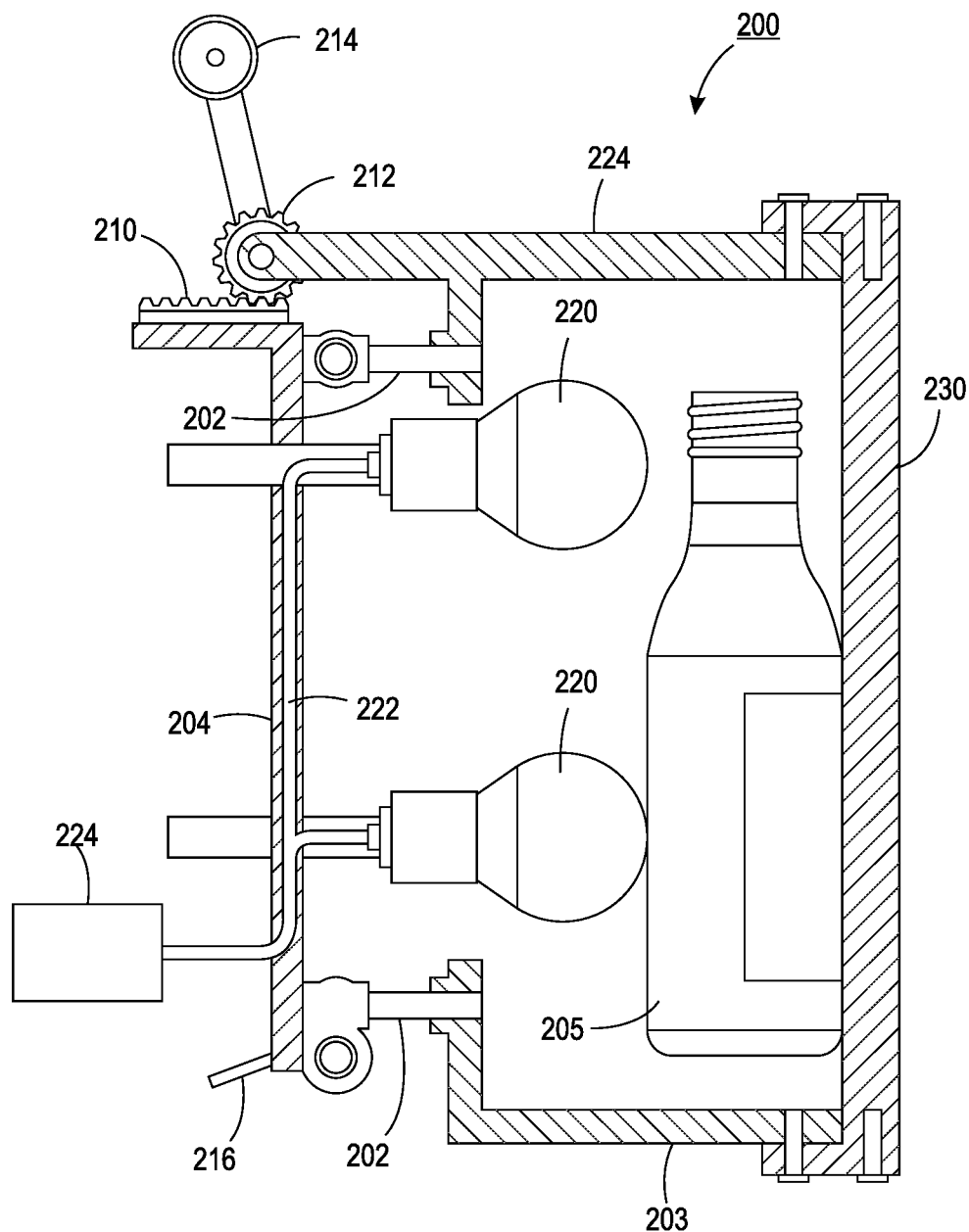
FIG. 3 illustrates an exemplary universal 3-D object holder that includes small gripper balls in an object capturing position.
Figure 7A:
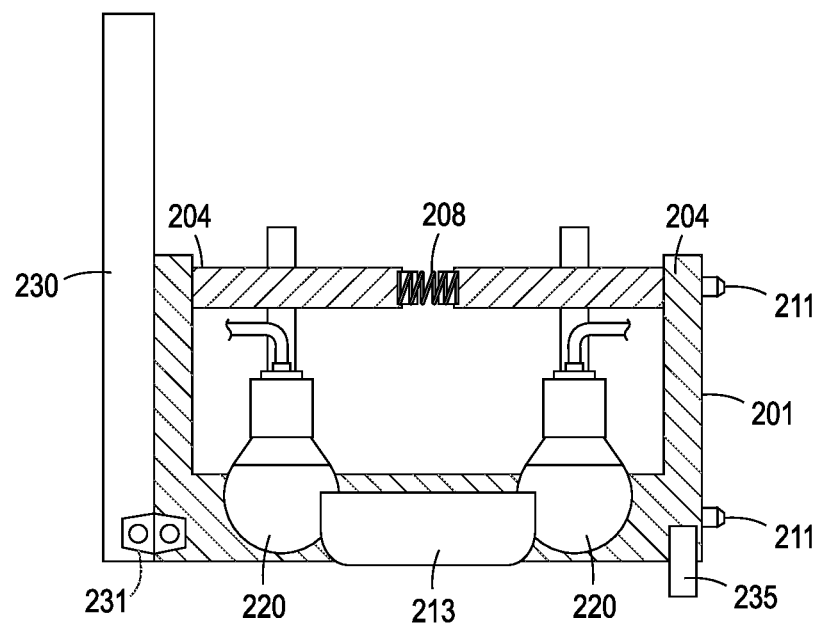
FIGS. 7A and 7B show top views of the universal 3-D object holder in FIG. 3 with a datum plate open and closed.

Turning now to the present disclosure, a generic or universal object gripper 200 in FIG. 3 includes a repositionable support fixture 201 supporting an object 205 for receiving printing. A datum plane member 230 encloses fixture 201 and represents desired spacing of object 205 away from print heads 104 when pins 211 of universal object gripper 200 in FIG. 7A are inserted into holes 110 in moveably mounted member 112 in FIG. 1. Support fixture 201 includes multiple elastic and conformable gripper balls 220 supported for a portion thereof to move horizontally within back plate 204 through holes 206 shown in FIG. 4A. One example of conformable gripper balls 220 is a VERSA-BALL® Kit sold by Empire Robotics. A flexible hose or tube 222 is connected to both positive and negative pressure source 224 and applies air pressure or vacuum pressure to conformable gripper balls 220. Conformable gripper balls 220 include granular material therewithin that becomes loose and moves freely to contour to any shape when pressurized and conversely becomes rigid when vacuum pressure is applied.

A rack 210 and pinion 212 mechanism connected to conformable gripper balls 220 is controlled by moving lever 214 in a clockwise direction to retract the conformable gripper balls 220 from object 205 along shafts 202. Locking lever 216 holds the balls in place. Conformable gripper balls 220 can be positioned as desired by locating the gripper shafts in one of the grid pattern of holes 206 in back plate 204 and adjusted towards and object by threading shafts connected to conformable balls 220 to different depths in back plate 206. Multiple gripper balls allow for holding an object larger in size than a single gripping ball and they also can be used for gripping the interior of objects. Advantages of using multiple conformable balls 220 to grip objects over a single ball include the ability to support objects from behind as well as grip them on the sides, especially so for flat, thin and rectangular objects.

Figure 4A:
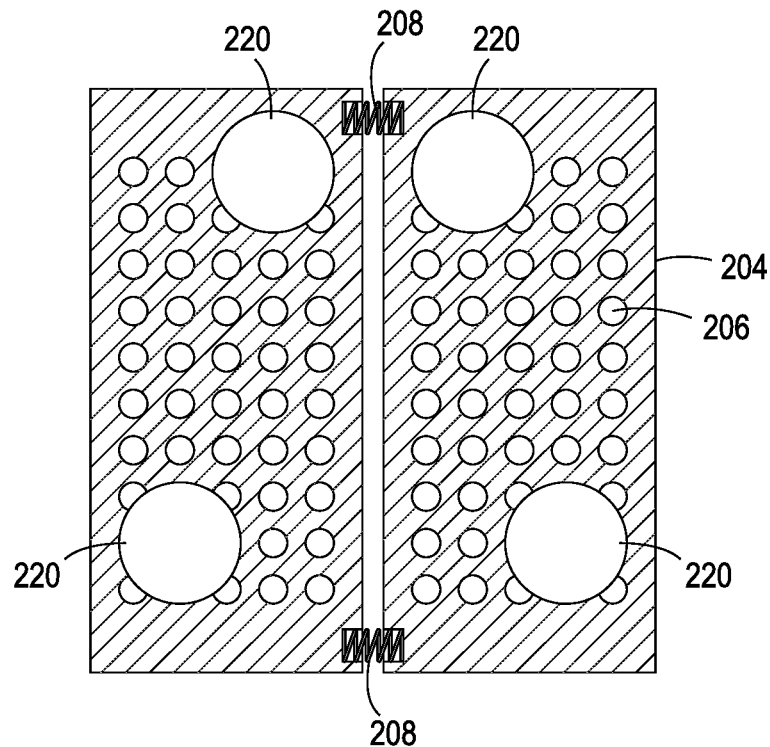
FIGS. 4A and 4B illustrate a front top views of the exemplary universal 3-D object holder in FIG. 3 showing positioning of multiple gripper balls.
Figure 4B:
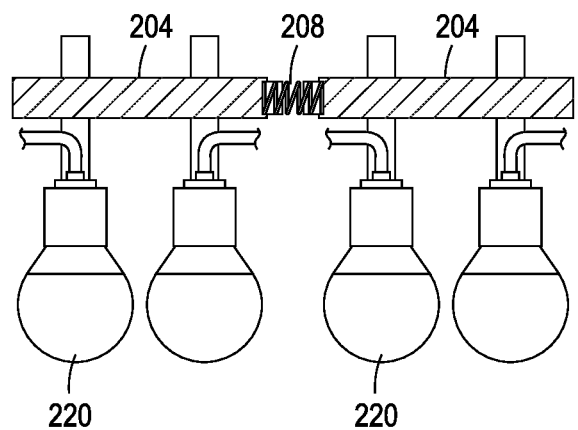
Figure 5A:
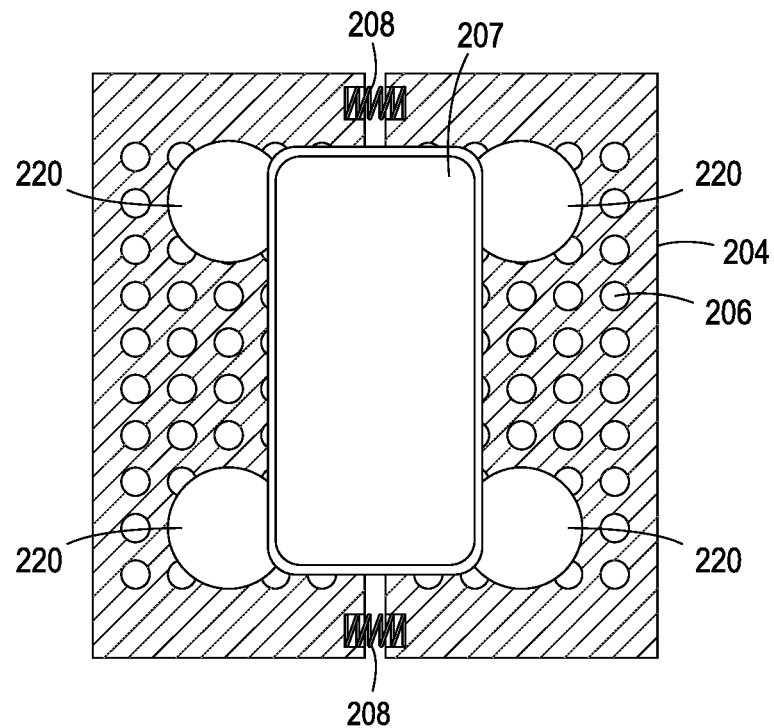
FIGS. 5A and 5B show front and side views of the exemplary universal 3-D object holder in FIG. 3 holding a cell phone shaped object.
Figure 5B:
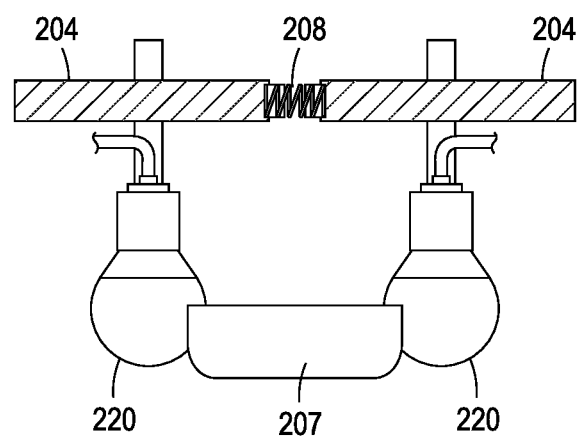
Figure 6A:
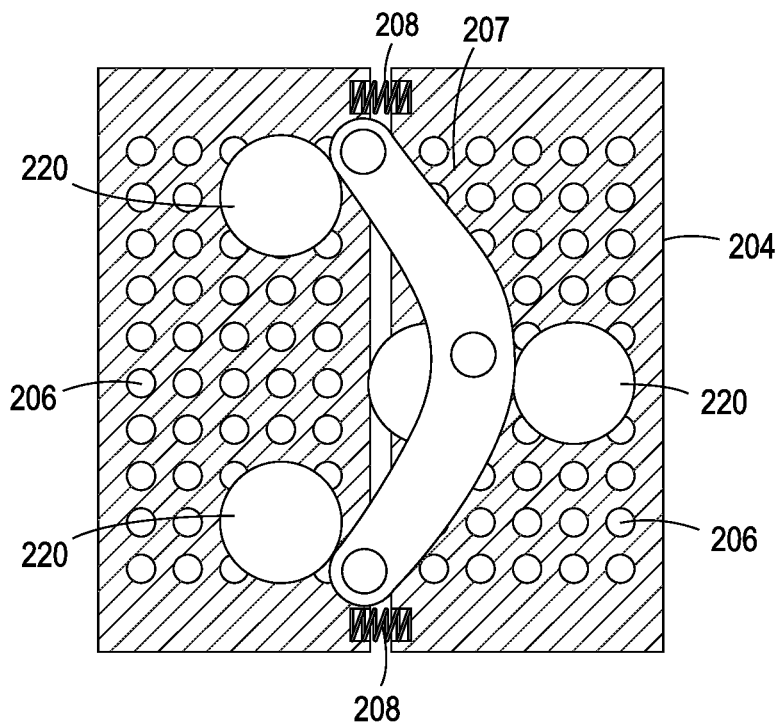
FIGS. 6A and 6B depicts front and top views of the universal 3-D object holder in FIG. 3 contacting a boomerang shaped object.
Figure 6B:
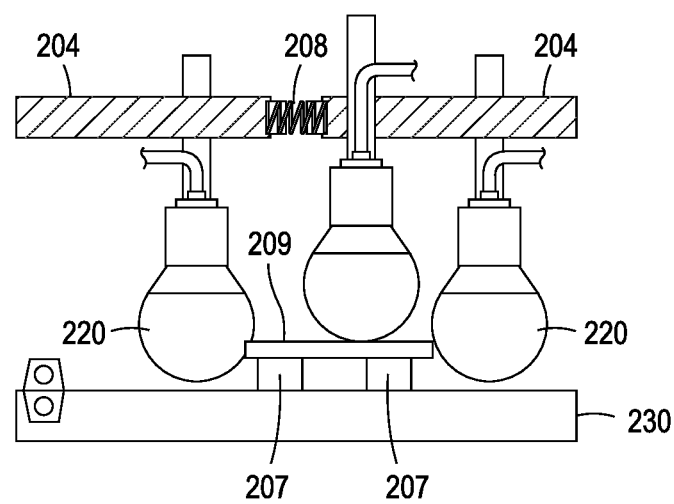

In FIGS. 4A and 4B, conformable gripper balls 220 are shown positioned on back plate 204 through openings 206 as viewed from print heads 104 in FIG. 4A. Back plate 204 has two parts connected by springs 208 that contribute to stabilizing an object under control of conformable gripper balls 220 and openings 206 allows multiple object shapes and sizes to be accommodated. Although conformable gripper balls on the left and right of the two parts of back plate 204 are drawn together by spring force of springs 208, they could also be spread apart by compression spring force when gripping the interiors of objects, for example, when printing on the bottom of a cup. Positioning of conformable gripper balls 220 while gripping a cell phone shaped object is shown in FIGS. 5A and 5B and in FIGS. 6A and 6B conformable gripper balls 220 are shown positioned for gripping a boomerang shaped object 209. Shims 207 shown in FIG. 6B are used for thin objects that may be too shallow to grab directly if pressed against datum plate 230. The shims lift the object a short distance away from datum plate 230 and should be used only for flat objects because the lift distance will increase the print gap and use some of the available latitude. As shown in FIG. 6B, a conformable gripper ball 220 can be used against the back of flat objects to improve stability.

Figure 7B:
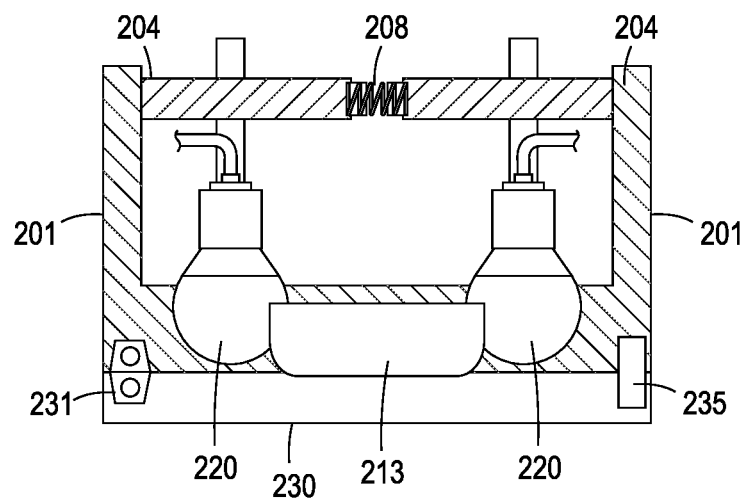

Datum plate 230 is shown in FIG. 7A pivoted in a clockwise direction on pivot plate 231 into an open position for loading object 213. Datum plate 230 has been closed and secured by latch 235 in FIG. 7B for acquisition of object 213 by conformable gripper balls 220. Once object 213 is held in place by conformable gripper balls 220, datum plate 230 is pivoted into its open position as shown in FIG. 7A which enables a smaller footprint for printer 100 by removing a requirement that the printer have sufficient room for datum plate 230 to swing open for printing to occur while it is installed in the print location. Afterwards, universal object holder 200 is placed into printing system 100 by inserting docking locating pins 211 into holes 110 in moveably mounted member 112 in FIG. 1.

In practice, lever 214 is used to retract conformable gripper balls 220 and an object is placed onto staging shelf 203. Conformable gripper balls 220 are adjusted so that they engage edges of the object through placement of their shafts into holes 206 in the grid pattern of back plate 204. Orthogonal positioning of conformable gripper balls 220 is accomplished by threading their shafts to a different depth in back plate 206. Once conformable gripper balls 220 are positioned generally, datum plate 230 is rotated into a closed position and secured by latched 235. Back plate 204, along with all conformable gripper balls 220, is now allowed to engage under load of springs 208 and air in evacuated from conformable gripper balls 220 with vacuum source 224 to make them rigid. The object is pressed against datum plate 230 which represents a known orientation plane with respect to the surface of print heads 104, thereby ensuring that the objet will be appropriately oriented for printing. Once the object is gripped, the datum plate 230 is opened and printing can now begin.

It should now be understood that a universal object holder that can be used for holding objects in Direct to Object printing has been shown that includes a staging surface that represents the datum defined by the machine print heads. The object to be printed upon is staged against this datum and a series of elastic gripper balls are positioned through holes is a spring biased back plate conforming to the shape of the object and pressed against the object. Vacuum is applied to the series of gripper balls causing them to collapse around and grip the object. With the object now being gripped the universal object holder is placed into cabinet 180 in FIG. 2 for imaging.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An object gripper for gripping various object shapes, comprising:
   a support and a plurality of conformable gripper balls configured for horizontal movement within said support, said plurality of conformable gripper balls being filled with granular material that goes from a conformable to rigid state when vacuum is applied;
   a pressure source adapted to apply air pressure into said plurality of conformable gripper balls to loosen and free up movement of said granular material and subsequently apply a vacuum to said plurality of conformable gripper balls to remove friction between the granular material to thereby tighten and lock said plurality of conformable gripper balls to an object;
   a staging shelf connected to said support for placement of said object;
   said plurality of conformable gripper balls are configured for movement within said support towards and away from said object;
   said support and said plurality of conformable gripper balls are configured to be biased against said object; and
   a datum plate, said datum plate is connected to said support and adapted to be placed in a first position when said object is placed on said staging shelf and a second position after said object has been gripped by said plurality of conformable gripper balls, and wherein said datum plate is configured to ensure that said object will be located within a predetermined plane for further processing.

2. The object gripper of claim 1, wherein said support includes a two-part back plate connected thereto.

3. The object gripper of claim 2, wherein said support and said plurality of conformable gripper balls are biased against said object with springs.

4. The object gripper of claim 2, including a locking lever configured to prevent movement of said two-part back plate once said two-part back plate has been placed into a predetermined position.

5. The object gripper of claim 1, including docking pins for positioning said object gripper within a 3-D printer.

6. The object gripper of claim 2, wherein said two-part back plate includes a grid pattern of holes configured for placement of gripper shafts supporting said plurality of conformable gripper balls.

7. The object gripper of claim 6, wherein positioning of said conformable gripper balls within said two-part back plate is accomplished by locating said gripper shafts in respective ones of said grid pattern of holes within said two-part back plate.

8. The object gripper of claim 7, wherein variable depth positioning of said conformable gripper balls within said two-part back plate toward said object is accomplished by rotating said gripper shafts within said respective ones of said grid pattern of holes within said two-part back plate.

9. The object gripper of claim 8, wherein said gripper shafts include a screw thread portion.

10. The object gripper of claim 1, wherein said plurality of conformable gripper balls are positioned orthogonally with respect to said object.

11. The object gripper of claim 1, wherein said plurality of conformable gripper balls are configured for gripping the interior of objects.

12. The object gripper of claim 1, wherein said plurality of conformable gripper balls are configured for gripping objects from behind as well on their sides.

13. The object gripper of claim 2, including springs positioned between the two parts of said two-part back plate and configured to bias said two parts of said two-part back plate by force.

14. The object gripper of claim 13, wherein said two parts of said two-part back plate are biased towards each other.

15. The object gripper of claim 13, wherein said two parts of said two-part back plate are biased away from each other.

16. The object gripper of claim 13, wherein said two parts of said two-part back plate are biased towards each other when gripping outside portions of objects.

17. The object gripper of claim 13, wherein said two parts of said two-part back plate are biased away each other when gripping objects from inside objects.

18. The object gripper of claim 6, wherein said a grid pattern of holes configured for placement of gripper shafts supporting said plurality of conformable gripper balls accommodates a wide variety of object shapes and sizes.

19. The object gripper of claim 1, wherein said datum plate is pivoted into an open position for loading said object.

20. The object gripper of claim 19, wherein said datum plate is pivoted in a clockwise direction for loading said object.

\* \* \* \* \*